United States Patent
Almstead et al.

(10) Patent No.: US 6,499,114 B1
(45) Date of Patent: Dec. 24, 2002

(54) REMOTE DIAGNOSTIC SYSTEM AND METHOD COLLECTING SENSOR DATA ACCORDING TO TWO STORAGE TECHNIQUES

(75) Inventors: John Gamwell Almstead, Altamont, NY (US); Maheshch Amritlal Morjaria, Niskayuna, NY (US); Keith Andrew Longtin, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/251,654

(22) Filed: Feb. 17, 1999

(51) Int. Cl.$^7$ ................................ H02H 3/05
(52) U.S. Cl. .................. 714/25; 714/724; 709/224; 399/26
(58) Field of Search .................. 714/25, 26, 46, 714/724, 47; 399/26, 24; 702/183; 709/224; 710/12

(56) References Cited

U.S. PATENT DOCUMENTS

| | | | | |
|---|---|---|---|---|
| 4,602,127 A | * | 7/1986 | Neely et al. | 379/68 |
| 5,422,824 A | * | 6/1995 | Biehler et al. | 702/183 |
| 6,182,249 B1 | * | 1/2001 | Wookey et al. | 714/47 |
| 6,289,379 B1 | * | 9/2001 | Urano et al. | 709/223 |

* cited by examiner

Primary Examiner—Robert Beausoleil
Assistant Examiner—Rita A Ziemer
(74) Attorney, Agent, or Firm—Foley & Lardner (57) ABSTRACT

A remote monitoring diagnostic system and method utilize two different storage techniques. A time-coherent storage technique and change-detect storage technique are utilized to ensure that sensor signals are stored accurately and efficiently. A central diagnostic system can poll or pull the sensor values remotely. Additionally, an on-site monitor can perform anomaly detection to generate malfunction data.

20 Claims, 5 Drawing Sheets

REMOTE DIAGNOSTIC SYSTEM AND METHOD COLLECTING SENSOR DATA ACCORDING TO TWO STORAGE TECHNIQUES

BACKGROUND OF THE INVENTION

The present invention generally relates to a method and apparatus for locally collecting data and diagnosing malfunctions. More particularly, the present invention is related to a system and a method that enable a combination of on-site anomaly detection and remote data analysis.

Safety and efficiency considerations require that operating conditions of various processes be continuously monitored to obtain an early indication of possible malfunctions. Early indications of possible malfunctions allow corrective measures to be taken more quickly, thereby reducing waste and preventing more serious and potentially hazardous conditions.

Some industrial processes, such as, the generation of electricity, the operation of an aircraft engine or locomotive, the manufacturing of steel or paper, or other processes implemented by industrial drives or equipment, utilize hundreds or thousands of sensors to obtain on-line indications of operating conditions and parameters. In one particular example of an industrial process, turbine generator equipment in a power plant can be remotely monitored and diagnosed to improve its availability and performance. Certain turbine generator equipment can be utilized with an on-site monitor that collects and stores data which is downloaded to a central site for diagnostic analysis. The central site can utilize any number of expert systems or rule-based systems to automatically detect malfunctions. Additionally, an operator or engineer can review the data to determine if the turbine is functioning properly. Other processes, such as, those processes occurring in airplanes, locomotives, steel mills, paper mills, and factories, can utilize equipment which is remotely monitored in a similar fashion to the turbine generator equipment described above.

To improve availability of equipment and performance of complex processes, the earliest possible detection of detrimental conditions is necessary. Early detection permits appropriate action to be taken to minimize the impact of such conditions and to prevent consequential damage. Early detection can be achieved through continuous detailed evaluation of the operating condition of the equipment (e.g., the turbine and generator equipment in a power plant). This requirement for early detection is especially critical when deterioration of equipment can happen in relatively short periods of time (in several minutes to a few hours), which, if left uncorrected, can have significant impact on the availability and performance of the equipment. Equally important to improved availability and performance of complex processes is the ability to accurately identify a developing condition. For example, in a power plant, the consequence of unnecessarily interrupting turbine operation is costly to an operator. Similarly, in other industrial processes, unnecessarily interrupting equipment is costly, especially in complex processes which utilize expensive equipment, such as, steel fabrication, paper fabrication, airplane operation and locomotive operation. Thus, the accurate diagnosis of detrimental conditions and developing conditions is critical to the efficient operation of complex processes.

The key factors to precise identification of detrimental conditions and developing conditions are accuracy and completeness of the data (e.g., the appropriate data logged in the most informative manner), timeliness of the data, and background fleet data to facilitate accurate analysis.

Generally, sensor signals are not continuously stored in memory because of the large amount of communication and storage overhead associated with the large number of sensors. Accordingly, some systems utilize a "deadband" technique to store sensor signals; the deadband technique only stores a signal when the signal exceeds a previously stored value by a predetermined amount (e.g., only stores those signals which exhibit a predetermined difference in value from a previous scan). With such systems, general trends and changes associated with the sensor signals over long periods of time can be stored efficiently in memory.

Alternatively, some systems utilize a time-coherent data storage technique where the sensors are all scanned simultaneously and periodically stored. The sensors are stored for a period of time or for a particular number of readings. However, the archival time interval and number of readings are limited due to memory requirements. In addition, this technique can miss recordation of rapid signal changes if the signal change does not occur during the time of the reading (e.g., in a period between readings).

Although change-detect data storage techniques can be effective for data storage where the evaluation or analysis depends solely upon changes of monitored parameters, change-detect data storage techniques do not provide accurate definitions of instantaneous relationships among parameters. Accurate definitions of instantaneous relationships among parameters are critical to predicting and diagnosing malfunctions. Although time-coherent data storage techniques are effective where instantaneous relationships among systems parameter can be solely used for evaluation and analysis, rapid changes in parameter values are often missed in such an archiving scheme.

Conventional systems generally rely on the central site to perform sophisticated diagnostic analysis to detect malfunctions and anomalies. The central site includes computer equipment which can perform expert system diagnostics on the data downloaded from the remote location. In addition, it includes experts who can validate the conclusions of the automated diagnostic results. However, with such a scheme, anomaly detection and malfunction diagnosis cannot occur until the data is made available to the central site. Accordingly, a delay can prevent the central site from uncovering serious and potentially hazardous conditions as quickly as possible without continuous transfer of data to the central location. On-line or real time expert system anomaly detection is not possible without continuous transfer of data to the central location. In addition, conventional systems which solely rely upon central site diagnostics require that communication overhead be utilized to transfer data when systems are working appropriately and anomalous conditions are not present (i.e., communication overhead is wasted transferring "healthy" data to the central site).

Accordingly, there is a need for a diagnostic system that is not susceptible to the disadvantages associated with a change-detect only or time-coherent data only storage technique. Further still, there is a need for a diagnostic system that performs local anomaly detection to reduce response time to anomalous equipment or process conditions and to reduce the transfer of healthy unit data to a central location. Even further still, there is a need for a diagnostic system that combines the advantages of time-coherent data storage techniques and change-detect data storage techniques. Yet further, there is a need for a diagnostic system which performs real time, on-line anomaly detection.

SUMMARY OF THE INVENTION

The present invention relates to a diagnostic system for analyzing operation of a process. The process is monitored by sensors, each of which senses a different parameter associated with the operation of the process. The diagnostic system includes a local diagnostic unit. The local diagnostic unit is located at a site associated with the process and receives sensor signals from the sensors. The local diagnostic unit periodically and simultaneously stores the sensor signals. The local diagnostic unit stores one sensor signal of the sensor signals whenever the one sensor signal deviates from a previously stored value by a first predetermined amount.

The present invention relates to a diagnostic system for analyzing operation of a process. The diagnostic system includes a local database, and a local diagnostic unit. The local diagnostic unit is located at a site associated with the process. The local diagnostic unit receives a plurality of parameters associated with the process. The local diagnostic unit periodically stores the parameters in the local database. The local diagnostic unit continuously performs a local diagnostic analysis in response to the parameters and stores malfunction data in the database. The malfunction data indicates a probability of an anomaly.

The present invention even further still relates to a method of diagnosing anomalies in an industrial process. The method includes storing a plurality of different parameters on a time-coherent basis, storing at least one of the parameters on a change detect basis, generating, with the on-site monitor, malfunction data in response to the parameters, and communicating the malfunction data and the stored parameters to a remote diagnostic center. The parameters are stored in a database in the on-site monitor, and the malfunction data is stored in the database in the on-site monitor.

BRIEF DESCRIPTION OF THE DRAWINGS

The present invention will hereafter be described with reference to the accompanying drawings, wherein like numerals denote like elements and.

DESCRIPTION OF PREFERRED EXEMPLARY EMBODIMENTS OF THE PRESENT INVENTION

Figure 1:
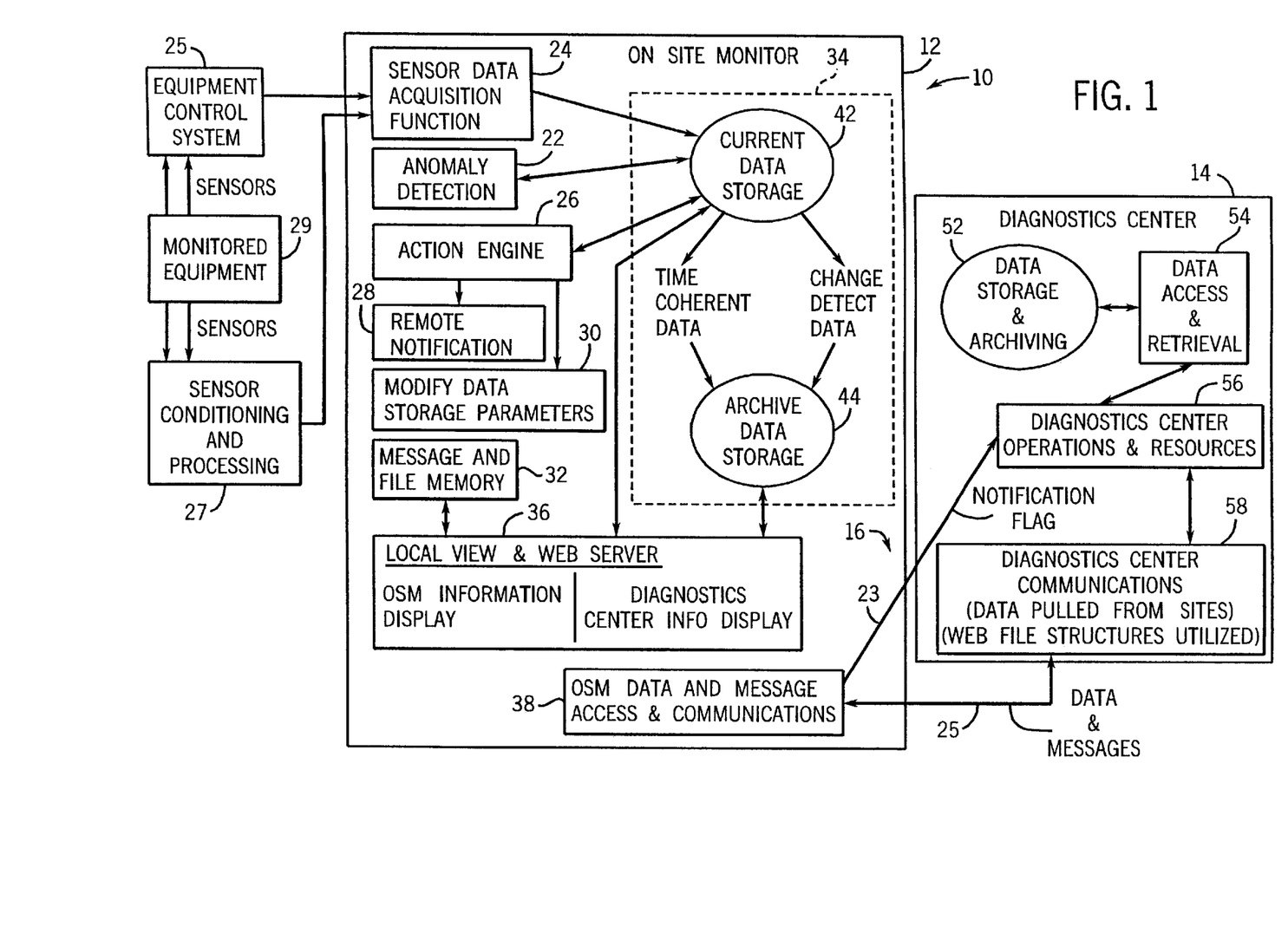
FIG. 1 is a general schematic block diagram of a diagnostic system including an on-site monitor and a diagnostic center, in accordance with an exemplary embodiment of the present invention.

With reference to FIG. 1, a diagnostic system 10 can be utilized to monitor a process and diagnose anomalies or detect malfunctions associated with an industrial process. The industrial process can be any relatively complex method which receives parameters or information from equipment which implements the industrial process. The parameters or information can be derived directly or indirectly from sensors, control panels, monitoring devices, or other apparatus. The industrial process can be the operation of an aircraft engine or locomotive, the fabrication of steel or paper, or other processes rendered by industrial drives or equipment. Accordingly, system 10 can be utilized in airplanes, trains or locomotives, steel mills, paper mills, power plants, or other industrial facilities.

Diagnostic system 10 includes a local computer or an on-site monitor 12 and a diagnostic center 14. On-site monitor 12 and diagnostic center 14 can communicate over a link 16. Link 16 can be a telephone wire or wires, modem connections, satellite connections, fiber optic connections, a wireless channel or channels, or any media across which information may be transmitted or received. Link 16 includes a notification flag link 23 and a data and message link 25.

On-site monitor 12 is preferably situated locally with respect to the process which it is monitoring. For example only, in a power plant, on-site monitor 12 can be located within the power plant and interfaced with monitored equipment 29 (e.g., a turbine or generator). Monitor 12 can receive signals from sensors and control devices which communicate with the turbine. Additionally, monitor 12 can receive parameter and sensor signals from other devices which monitor the turbine. For example, monitor 12 can receive sensor data from a vibration monitor which communicates with the turbine. In an aircraft application, monitor 12 can be located within the fuselage, engine, or cockpit of the aircraft.

On-site monitor 12 can be coupled to an equipment control system 25 and a sensor conditioning and processing circuit 27. System 25 and circuit 27 are generally associated with the process associated with the operation of monitored equipment 29. In the power generation example, monitored equipment 29 can be a turbine and system 25 and circuit 27 can be equipment associated with the turbine. In the aircraft embodiment, monitored equipment 29 can be a jet engine and equipment control system 25 can be an aircraft data computer or electronic engine control unit. Alternatively, monitored equipment 29 can be any industrial device utilized in any industrial processes.

Generally, sensors associated with monitored equipment 29 provide signals and parameters to equipment control system 25 and sensor conditioning and processing circuit 27. System 25 and circuit 27 can provide an interface for conditioning and digitizing signals from sensors. Alternatively, sensors associated with monitored equipment 29 can be directly coupled to monitor 12.

On-site monitor 12 can be a Texas Micro PC running a Windows® operating system or other industrial computer or controller. Alternatively, other work stations, computer systems, or controllers can be utilized. A UNIX® operating system can also be utilized. On-site monitor 12 is preferably programmed by software to perform the data storage, anomaly detection, and diagnostic functions described below with reference to FIGS. 1–5. The specific hardware implementation of on-site monitor 12 is not discussed in a limiting fashion. On-site monitor 12 preferably includes a compact disc drive, or other storage device. Alternatively, other memory or tape and disc storage devices can be utilized.

With reference to FIG. 1, on-site monitor 12 includes an anomaly detection module 22, a sensor data acquisition module 24, an action engine 26, a remote notification module 28, a data storage parameter modification module 30, a message and file memory 32, a data storage unit 34, local view and web server module 36, and a communications module 38. Data storage unit 34 includes current data storage 42 and archive data storage 44. Sensor data acquisition module 34 is coupled to equipment control system 25 and sensor conditioning and processing circuit 27.

Diagnostic center 14 includes a data storage and archive module 52, a data access and retrieval module 54, a diagnostic center operation and resource module 56, and a diagnostic center communications module 58. Center 14 can be a single site resource or have resources located at several physical locations. Center 14 can be a workstation, a network of workstations, a mainframe system or other computing apparatus.

Diagnostic center 14 communications module 58 transmits and receives data and messages to and from communications module 38 of on-site monitor 12 over data and messages link 25 of link 16. Link 25 can be a bi-directional communication link, such as, a modem/telephone line. Module 38 provides notification flags to center 14 via notification flag link 23. Link 23 can be a uni-directional or bi-directional link, such as, a modem/telephone line, a wireless link, or other channel.

Diagnostic center 14 can be at any remote location from on-site monitor 12. Center 14 can be located in Schenectady, N.Y., where diagnostic information from a variety of sites is monitored. Alternatively, center 14 can be within the premises of the plant and only several feet from monitor 12. Center 14 generally receives sensor data and malfunction data from a number of sources similar to monitor 12.

Current data storage 42 and archive data storage 44 of data storage unit 34 can be separate or integral storage devices, such as, a writeable compact disk memory, hard disk drives, solid state memory, flash memory, tape storage, floppy disks, or any device for storing data. Preferably, data storage unit 34 is at least one hard disk drive associated with on-site monitor 12.

Anomaly detection module 22 performs on-line, real time diagnostics on parameters or signals in current data storage 42 of unit 34. On-site monitor 12 receives the signals or parameters from system 25 and circuit 27 and stores the signals or parameters in current data storage 42. The signals or parameters can be operator selections, sensor signals, or other representations of measurements or events. Sensor data acquisition module 24 serves as an interface between current data storage 42 and both of system 25 and circuit 27.

Module 22 can perform complex algorithms and expert system analysis to locally generate malfunction data or anomaly parameters which are stored in current data storage 42. Module 22 can analyze historical malfunction data as well as the sensor data. Module 22 performs real time, on-line anomaly detection in parallel with the other operations of on-site monitor 12.

The malfunction data can be in the form of probability factors associated with particular anomalies. For example, probability factors can indicate equipment or operational anomalies for a turbine, a locomotive, or an aircraft engine. Combustion anomalies can be determined by module 22 of monitor 12 in response to a pattern of parameters associated with exhaust gases (e.g., signals from exhaust gas temperature and pressure sensors). As an example only, probability factors can indicate transient conditions in a turbine; the transient condition probability factor can be determined by locally analyzing sensors associated with speed and load parameters. In still another example, probability factors can indicate lubrication anomalies in pumps, engines, turbines, motors, or other industrial equipment; the lubrication anomalies can be locally determined by module 22 of monitor 12 by analyzing sensors associated with oil pressure and temperature. The probability factors can be a number of variables which are associated with a particular anomaly. The probability factors can represent a percentage chance that an anomaly exists (e.g., 25% chance of a combustion anomaly, 35% chance of a lubrication anomaly, etc.) The number and types of anomalies detected are not discussed in a limiting fashion. Also, the association of probabilities to anomalies and the actual numeric manifestation of the probability are not discussed in a limiting fashion.

Anomaly data can include calculated parameters, derived parameters, or intermediate parameters which are not necessarily by themselves indicative of a malfunction. For example, module 22 can generate intermediate parameters which are utilized to create malfunction data which is indicative of a particular malfunction. The intermediate parameters can be derived from sensor values or other intermediate parameters. Thus, malfunction data is related to particular malfunction while anomalous data is more generic and may or may not directly relate to a particular malfunction.

According to an exemplary embodiment, intermediate parameters can include operational parameters, such as, the actual efficiency of a generator and the expected efficiency of the generator. The difference between the expected and actual efficiency can be utilized to detect a malfunction (e.g., to generate malfunction data). In another alternative, intermediate parameters can include sensor deviations from its own value or from a neighboring or related sensor value.

Anomaly detection module 22 advantageously can utilize any data stored in current data storage 42 to generate malfunction data. Current data storage 42 stores parameters (sensor data) and malfunction data for a particular number of readings. Current data storage 42 operates as a cache or buffer for storing relatively recently entered parameters.

Storage 42 is configurable to store any number of readings for each parameter. The sensor data can be arranged in sets associated with particular anomalies. The set of sensor data for a particular anomaly can be identified with a flag when stored in storage 42 or storage 44. A sensor value can be included in more than one set of sensor data.

Multiple subsets of sensor values and anomaly data can be stored at specific intervals associate with the subsets. According to an exemplary embodiment, sensor values, such as, vibration parameters can be included in a set with performance values, such as, turbine speed parameters. The set of values can be stored every hour, every four hours, or other time interval. Thus, the sets can include solely sensor values, solely intermediate values, or both intermediate values and sensor values. Additionally, sets can include malfunction data.

On-site monitor 12 utilizes both a change detect (e.g., a dead band) technique and a time-coherent technique to store sensor data (signals and parameters stored in current data storage 42 from sensor data acquisition module 24) in archive data storage 44. Monitor 12 also utilizes both a change-detect technique and a time-coherent technique to store anomaly data (including malfunction data) from current data storage 42 to archive data storage 44. Archive data storage 44 serves as a more permanent archive than storage 42. The sensor data and anomaly data stored in archive data storage 44 can be transmitted across link 25 to diagnostic center 14. The sensor data and the anomaly data is transmitted by communication module 38 of monitor 12 and received by communications module 58 of center 14. Additionally, the sensor data and the anomaly data can be viewed and stored via local view and web server module 36. Module 36 is preferably linked with a web server and has display capabilities which allows data in storage 44 as well as data in storage 42 to be viewed locally.

The anomaly data from archive data storage 44 and the sensor data from archive data storage 44 can be sent during the same or different transmissions across link 16. Diagnostic center 14 can perform further diagnostics on the sensor data and the anomaly data, through resource module 56. In addition, center 14 can store the sensor data and the anomaly data in data storage and archival module 52 through data access and retrieval module 54.

Time-coherent storage parameters and change detect storage parameters can be adjusted by modify data storage parameter module 30 in response to action engine 26. For example, action engine 26 can analyze malfunction data and sensor data in current data storage 42 to determine that a "snap-shot" of parameters be stored as described below, that the change detect interval be adjusted, or that the time-coherent interval be adjusted.

The time-coherent data storage technique stores a multitude of sensor values (sensor data) and anomaly data simultaneously and periodically from storage 42 in storage 44. The term "simultaneously" refers to within a close period of time and does not necessarily mean exactly at the same time. Simultaneously storing a multitude of sensor values allows relatively instantaneous relationships between parameters to be recorded. Depending upon the equipment condition and the parameters being recorded, the interval of time between the coherent data set capture can be adjusted. The purpose of the time-coherent data storage technique is to allow inferences to be drawn from relationships between sensor signals.

On-site monitor 12 stores sensor data and malfunction data on a change-detect basis in archive data storage 44 by comparing each previously stored value (sensor data or anomaly data) on each scan with the most recently scanned value. If the most recently scanned value from current data storage 42 differs from the stored value in storage 44 by a predetermined amount, the value is stored in storage 44. The time of the scanning of the value is also stored. The predetermined amount is also alterable based upon operating condition (e.g., unit speed) or equipment condition. This adjustment can optimize data storage and fidelity. Preferably, software manufactured by OSI Software, Inc. implements change detect and data compression techniques for the storage of anomaly data and sensor data in archive data storage 44.

As stated above, on-site monitor 12 also stores sensor data and malfunction data on a time-coherent basis in archive data storage 44. With such a scheme, at least two sensor signals related to two different parameters are simultaneously stored on a periodic basis. By utilizing both the time-coherent and change-detect storage techniques, on-site monitor 12 ensures that data is accurately and efficiently stored. The change-detect data storage technique ensures that conditions, such as, "spikes" or other major rapid changes in parameter values, are not missed.

The time-coherent data storage technique ensures that the instantaneous relationship among system parameters is available. For example, speed and load relationships can be accurately kept by a time-coherent storage method. Time-coherent data storage technique ensures that the values for the stored parameters are known at a particular time with respect to each other.

Monitor 12 can also be configured to store sensor data, whenever an anomalous condition is detected. For example, all temperature sensors or even all sensors can be simultaneously stored if one of the temperature sensors exceeds a limit. In this way, a "snap-shot" of parameters is stored in archive data storage 44 when an anomalous condition is determined by module 22.

Time coherent data may be triggered by either a time period (e.g., second, minute, day, month, etc.) or as described above by detection of an anomalous condition. Multiple data sets may be defined for time coherent data capture, each data set containing a sub-set of the total data available, and each triggered at different time intervals and upon detection of different anomalous conditions.

On-site monitor 12 advantageously utilizes an integrated time-coherent and change detect data storage method which provides enhanced data resolution and analysis capabilities. On-site monitor 12 achieves flexibility through adjustments of data storage parameters via module 30. Additionally, data storage parameters are configurable for a particular application. The data evaluation and logging techniques of on-site monitor 12 enhance the capability of early detection of developing problems or system degradation, thereby permitting appropriate actions to minimize the impact of developing conditions.

Information derived from the results of diagnostic analysis performed by diagnostic center operations and resource module 56 can be provided across link 25 to communication module 38. Information from center 14 can be obtained through local view and web server module 36. Module 36 can utilize web-based viewing tools to view diagnostic results from center 14. Module 36 has access to message and file memory 32 for storing messages and data associated with the operation of monitor 12.

Action engine 26 analyzes data in current data storage 42 and causes remote notification module 28 to provide a notification flag across link 23 in response to an anomalous condition. The notification flag can be sent via a beeper network (line 23) or other communication medium. In this way, communications costs are minimized for communications from monitor 12 to center 14. Costs for communications across link 25 are accrued by center 14 which generally initializes the call to pull data from monitor 12.

Diagnostic center 14 provides a message across link 25 to obtain data in data storage unit 34 in response to the notification flag across link 23. In addition, center 14 can request additional information in response to the data provided by module 38. The notification flag notifies center 14 that monitor 12 has detected one of several anomalous conditions. Center 14 forms diagnostics on the data received from link 25 and can provide reports across link 25 to display and web server 36. Generally, diagnostic results are reported by telephone to an operator at the site associated with monitor 12. The diagnostic results can be provided to a General Electric secured network for access by module 36 of monitor 12. The diagnostic results can assist operator evaluation of the process and equipment 36. The diagnostic results and operational summary can also be provided in the form of periodic (e.g., monthly) reports.

For an exemplary monitor 12 employed in a power generation facility, sensor signals (values) and parameters can include the parameter values listed in Table 1 below. The sensor values are received by sensor data acquisition module 24. The sensor values can be generated by: vibration monitors, thermostats, timers, counters, pressure sensing devices, electric meters, flame detectors, flow meters, force sensors, speed sensors, position sensors, etc. Deviation values, minimum values, maximum values, and engineering units are also given in Table I. Monitor 12 stores the parameter in archive data storage 44 in accordance with the change-detect data storage technique whenever the sensor value changes from its previous value by the deviation value. The minimum factor indicates the period of time which must elapse before a value is stored again. The maximum factor indicates the period of time at which the value is stored even if a significant change has not occurred.

TABLE 1

| Description | eng.units | comp dev | comp max | comp min |
|---|---|---|---|---|
| Emergency Trips Counter | CNTS | 10000 | 28800 | 0 |
| Fast Load Start Counter | CNTS | 10000 | 28800 | 0 |
| Fired Starts Counter | CNTS | 10000 | 28800 | 0 |
| Fired Hours (Gas2) Counter | CNTS | 10000 | 28800 | 0 |
| Fired Hours (Gas2) Counter | CNTS15 | 10000 | 28800 | 0 |
| Fired Hours (Gas) Counter | CNTS | 10000 | 28800 | 0 |
| Fired Hours (Gas) Counter | CNT15 | 10000 | 28800 | 0 |
| Fired Hours (Liq) Counter | CNTS | 10000 | 28800 | 0 |
| Fired Hours (Liq) Counter | CNT15 | 10000 | 28800 | 0 |
| Fired Hours (Peak) Counter | CNTS | 10000 | 28800 | 0 |
| Fired Hours (Peak) Counter | CNT15 | 10000 | 28800 | 0 |
| Fired Hours (Total) Counter | CNTS | 10000 | 28800 | 0 |
| Fired Hours (Total) Counter | CNT15 | 10000 | 28800 | 0 |
| Fired Hours (Lean-Lean, Gas) Counter | CNTS | 10000 | 28800 | 0 |
| Fired Hours (Lean-Lean, Gas) Counter | CNT15 | 10000 | 28800 | 0 |
| Manually Initiated Starts Counter | CNTS | 10000 | 28800 | 0 |
| Fired Hours (Primary Mode, Gas) Counter | CNTS | 10000 | 28800 | 0 |
| Fired Hours (Primary Mode, Gas) Counter | CNT15 | 10000 | 28800 | 0 |
| Fired Hours (Pre-Mix, Gas) Counter | CNTS | 10000 | 28800 | 0 |
| Fired Hours (Pre-Mix, Gas) Counter | CNT15 | 10000 | 28800 | 0 |
| Fired Hours (Piloted Pre-Mix, Gas) Counter | CNTS | 10000 | 28800 | 0 |
| Fired Hours (Piloted Pre-Mix, Gas) Counter | CNT15 | 10000 | 28800 | 0 |
| Total Starts Counter | CNTS | 10000 | 28800 | 0 |
| Fired Hours (Tertiary Mode, Gas) Counter | CNTS | 10000 | 28800 | 0 |
| Fired Hours (Tertiary Mode, Gas) Counter | CNT15 | 10000 | 28800 | 0 |
| Barometric Pressure Transmitter | in H2O | 1 | 1800 | 0 |
| AMBIENT PRESSURE (PSIA) | PSIA | 0.5 (34.4 KPa) | 1800 | 0 |
| Compressor bellmouth differential press transmitter | in H2O | 1 | 1800 | 0 |
| Inlet air total press transmitter | in H2O | 0.2 | 1800 | 0 |
| Compressor Inlet Air Flow | lbs/s | 5 (2.22 Kg/s) | 1800 | 0 |
| Compressor Inlet Dry Air Flow | lbs/s | 5 (2.22 Kg/s) | 1800 | 0 |
| Inlet Duct Air Temperature | deg | 2 | 1800 | 0 |
| Vibration sensor | in/s | 0.005 (0.0127 cm/s) | 1800 | 0 |
| Vibration sensor | in/s | 0.005 (0.0127 cm/s) | 1800 | 0 |
| Vibration sensor | in/s | 0.005 (0.0127 cm/s) | 1800 | 0 |
| Vibration sensor | in/s | 0.005 (0.0127 cm/s) | 1800 | 0 |
| Vibration sensor | in/s | 0.005 (0.0127 cm/s) | 1800 | 0 |
| Vibration sensor | in/s | 0.005 (0.0127 cm/s) | 1800 | 0 |
| Vibration sensor | in/s | 0.005 (0.0127 cm/s) | 1800 | 0 |
| Vibration sensor | in/s | 0.005 (0.0127 cm/s) | 1800 | 0 |
| Vibration sensor | in/s | 0.005 (0.0127 cm/s) | 1800 | 0 |
| Vibration sensor | in/s | 0.005 (0.0127 cm/s) | 1800 | 0 |
| Vibration sensor | in/s | 0.005 (0.0127 cm/s) | 1800 | 0 |
| Max Vibration | in/s | 0.005 (.0127 cm/s) | 1800 | 0 |
| Bearing metal temp-generator bearing #1 | deg | 3 | 1800 | 5 |
| Bearing metal temp-generator bearing #1 | deg | 3 | 1800 | 5 |
| Bearing metal temp-generator bearing #2 | deg | 3 | 1800 | 5 |
| Bearing metal temp-generator bearing #2 | deg | 3 | 1800 | 5 |
| Bearing metal temp-turbine bearing #1 | deg | 3 | 1800 | 5 |
| Bearing metal temp-turbine bearing #1 | deg | 3 | 1800 | 5 |
| Bearing metal temp-turbine bearing #2 | deg | 3 | 1800 | 5 |
| Bearing metal temp-turbine bearing #2 | deg | 3 | 1800 | 5 |
| Bearing metal temp-red gear fwd bull | deg | 3 | 1800 | 5 |
| Bearing metal temp-red gear aft bull | deg | 3 | 1800 | 5 |
| Bearing metal temp-red gear aft bull | deg | 3 | 1800 | 5 |
| Bearing metal temp-red gear fwd pinion | deg | 3 | 1800 | 5 |
| Bearing metal temperature-red gear fwd pinon | deg | 3 | 1800 | 5 |
| Bearing metal temp-red gear aft pinion | deg | 3 | 1800 | 5 |
| Bearing metal temperature-red gear aft pinion | deg | 3 | 1800 | 5 |
| Bearing metal temp-thrust active | deg | 3 | 1800 | 5 |
| Bearing metal temp-thrust active | deg | 3 | 1800 | 5 |
| Bearing metal temp-thrust inactive | deg | 3 | 1800 | 5 |
| Bearing metal temp-thrust inactive | deg | 3 | 1800 | 5 |
| Bearing metal temp-torque conv radial brg | deg | 3 | 1800 | 5 |
| Bearing metal temp-torque conv radial brg | deg | 3 | 1800 | 5 |
| Bearing metal temp-torque conv thrust brg | deg | 3 | 1800 | 5 |
| Bearing metal temp-torque | deg | 3 | 1800 | 5 |

TABLE 1-continued

| Description | eng.units | comp dev | comp max | comp min |
|---|---|---|---|---|
| conv thrust brg | | | | |
| Specific Humidity | #H/#A | 0.2 | 1800 | 0 |
| Compressor disch press transmitter | psi | 2 (137.6 KPa) | 1800 | 0 |
| Compressor Pressure Ratio | prs R | 0.2 | 1800 | 0 |
| Inlet heating control valve position | % | 2 | 1800 | 0 |
| Position feedback IGV (high value selected) | DGA | 0.5 | 1800 | 0 |
| Inlet Bleed Heating | % | 2 | 1800 | 0 |
| VIGV Reference Angle | DGA | 2 | 1800 | 0 |
| Inlet Bleed Heat Max Selected Reference | % | 3 | 1800 | 0 |
| Inlet heating control valve command | % | 3 | 1800 | 0 |
| Inlet Housing Temperature Median | deg | 0.1 | 1800 | 0 |
| Compressor Discharge Temperature | deg | 5 | 1800 | 0 |
| Max Comp Inlet Flange Temperature | deg | 2 | 1800 | 0 |
| Generator Power Factor (Calculated) | PF | 0.1 | 1800 | 0 |
| Generator temp-cold gas coupling end | deg | 7 | 1800 | 0 |
| Generator temp-cold gas collector end | deg | 7 | 1800 | 0 |
| Generator temp-hot air coupling end | deg | 7 | 1800 | 0 |
| Generator temp-hot air collector end | deg | 7 | 1800 | 0 |
| Generator temp-stator collector end | deg | 7 | 1800 | 0 |
| Generator temp-stator collector end | deg | 7 | 1800 | 0 |
| Generator temp-stator collector end | deg | 7 | 1800 | 0 |
| Generator temp-stator coupling end | deg | 7 | 1800 | 0 |
| Generator temp-stator coupling end | deg | 7 | 1800 | 0 |
| Generator temp-stator coupling end | qdeg | 7 | 1800 | 0 |
| Generator VARs | MVAR | 2 | 1800 | 0 |
| Generator watts | MW | 1 | 1800 | 0 |
| Fuel gas flow orifice diff press xmitter | inH2O | 2 | 1800 | 0 |
| Fuel gas flow orifice diff press xmitter | inH2O | 2 | 1800 | 0 |
| Flame Detector | CNT15 | 100 | 1800 | 0 |
| Flame Detector | CNT15 | 100 | 1800 | 0 |
| Flame Detector | CNT15 | 100 | 1800 | 0 |
| Flame Detector | CNT15 | 100 | 1800 | 0 |
| Interstage fuel gas press xmitter | psi | 4 (275 KPa) | 1800 | 0 |
| fuel supply pressure in absolute units | psi | 4 (275 KPa) | 1800 | 0 |
| Fuel gas flow orifice upstream press xmitter | psi | 5 (344 KPa) | 1800 | 0 |
| Gas Fuel Flow | #/sec | 0.5 (1.1 Kg/s) | 1800 | 0 |
| Position fdback gas control valve (hi val selected) | % | 0.5 | 1800 | 0 |
| Quaternary GCV Position Feedback | % | 2 | 1800 | 0 |
| Position fdbck srv (high value selected) | % | 0.5 | 1800 | 0 |
| Secondary GCV Position Feedback | % | 0.5 | 1800 | 0 |
| Premix Splitter GCV Pos Fdbck | % | 2 | 1800 | 0 |
| Fuel Stroke Reference | % | 0.5 | 1800 | 0 |
| Rate Controlled Quaternary Flow Split | % | 1 | 1800 | 0 |
| Temperature Control Fuel Stroke Reference | % | 0.75 | 1800 | 0 |
| Gas Premix Valve Command | % | 0.5 | 1800 | 0 |
| Gas Fuel Premix Setpoint Reference | % SPLT | 0.5 | 1800 | 0 |
| Gas Fuel Split Setpoint | % SPLT | 0.5 | 1800 | 0 |
| Gas Splitter Valve Command | % SPLT | 0.5 | 1800 | 0 |
| Fuel Gas Temperature | deg | 1 | 1800 | 0 |
| | % SPLT | 1 | 1800 | 0 |
| Dew Point Temperature | deg | 2 | 1800 | 0 |
| Lube oil thermocouple #1 bearing drain | deg | 1 | 1800 | 0 |
| Lube oil thermocouple #2 bearing drain | deg | 1 | 1800 | 0 |
| Lube system temperature-generator #1 brg. Drain | deg | 1 | 1800 | 0 |
| Lube system temperature-generator #2 brg. Drain | deg | 1 | 1800 | 0 |
| Lube oil thermocouple turbine header | deg | 1 | 1800 | 0 |
| HP Turbine Speed | % | 1 | 1800 | 0 |
| Corrected Turbine Speed | % | 1 | 1800 | 0 |
| HP Turbine Speed (RPM) | rpm | 1 | 1800 | 0 |
| Speed reference | % | 1 | 1800 | 0 |
| Combustion Reference Temperature | deg | 1 | 1800 | 0 |
| Combustion Reference Temperature | deg | 1 | 1800 | 0 |
| Temperature Control Reference | deg | 1 | 1800 | 0 |
| IGV Temp Control Reference | deg | 2 | 1800 | 0 |
| Turbine temperature-wheelspace $1^{st}$ stg sft outer | deg | 1 | 1800 | 0 |
| Turbine temperature-wheelspace $1^{st}$ stg aft outer | deg | 1 | 1800 | 0 |
| Turbine temperature-wheelspace $1^{st}$ fwd inner | deg | 1 | 1800 | 0 |
| Turbine temperature-wheelspace $1^{st}$ stg fwd inner | deg | 1 | 1800 | 0 |
| Turbine temperature-wheelspace $2^{nd}$ stg aft outer | deg | 1 | 1800 | 0 |
| Turbine temperature-wheelspace $2^{nd}$ stg aft outer | deg | 1 | 1800 | 0 |
| Turbine temperature-wheelspace $3^{rd}$ stg aft outer | deg | 1 | 1800 | 0 |
| Turbine temperature-wheelspace $3^{rd}$ stg aft outer | deg | 1 | 1800 | 0 |
| Turbine temperature-wheelspace $3^{rd}$ stg aft outer | deg | 1 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |
| Exhaust Temp Thermocouple | deg | 2 | 1800 | 0 |

TABLE 1-continued

| Description | eng.units | comp dev | comp max | comp min |
|---|---|---|---|---|
| Ex Temp Median Corrected by Average | deg | 2 | 1800 | 0 |
| Combustion Monitor Actual Spread 1 | deg | 2 | 1800 | 0 |
| Combustion Monitor Actual Spread 2 | deg | 2 | 1800 | 0 |
| Combustion Monitor Actual Spread 3 | deg | 2 | 1800 | 0 |
| Combustion Monitor Allowable Spread | deg | 1 | 1800 | 0 |

Figure 2:
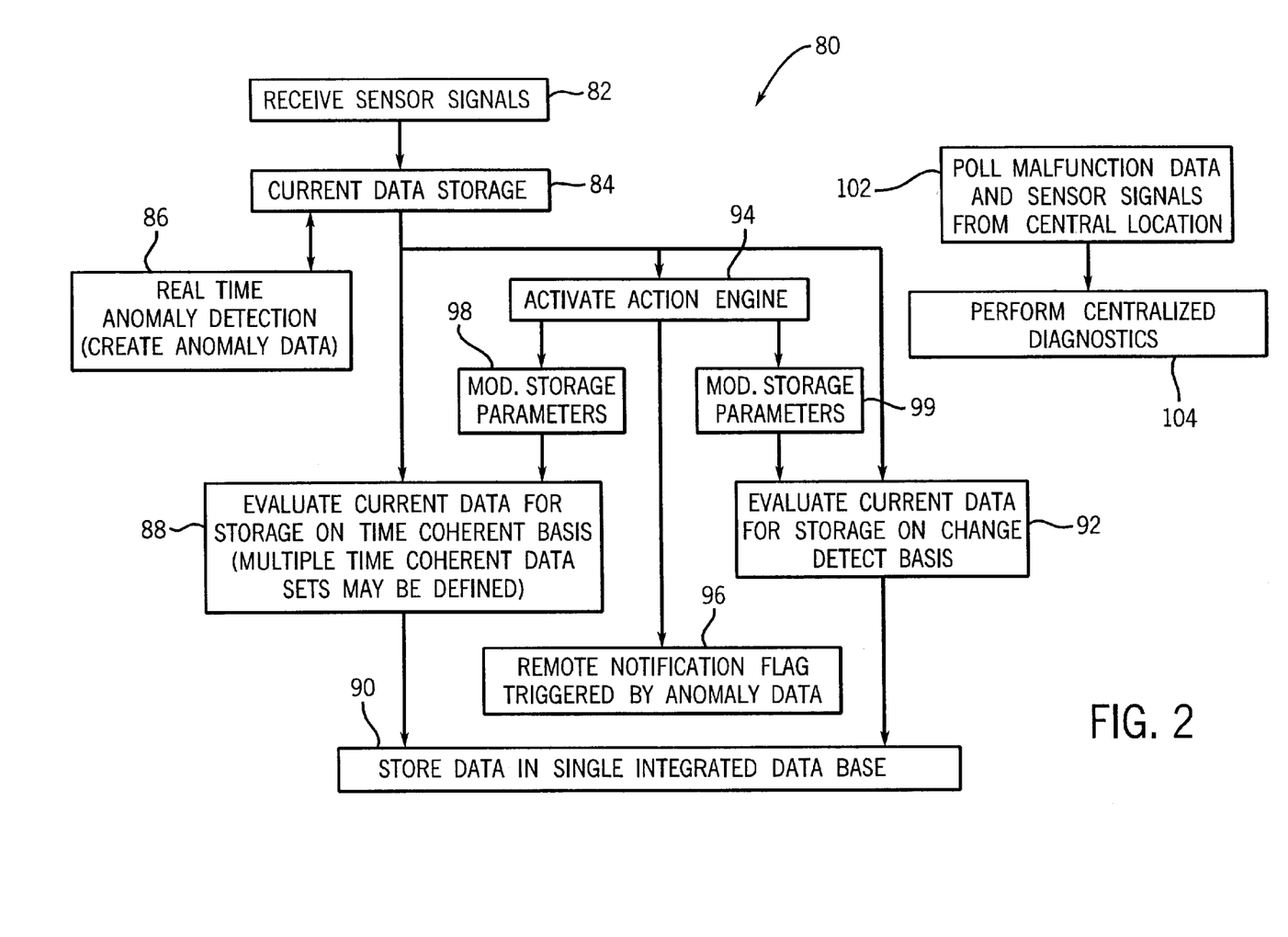
FIG. 2 is a general block diagram showing major data flows in the diagnostic system illustrated in FIG. 1, in accordance with another exemplary embodiment of the present invention.

With reference to FIGS. 1–5, the operation of diagnostic system 10 is described below as follows. In FIG. 2, a data flow diagram 80 represents data flow in on-site monitor 12 and diagnostic center 14. Sensor signals or parameters are continuously received or scanned by sensor data acquisition module 24 (FIG. 1) in an operation 82. The parameters or sensor signals are continually updated from module 24 in current data storage 42 in an operation 84. Anomaly detection module 22 continuously scans sensor data or parameters in current data storage 42 to generate anomaly or malfunction data in an operation 86. Operation 86 includes analyzing sensor data and malfunction data as well as other historical data. Operation 86 involves performing complex algorithms and utilizing expert systems to generate the malfunction data about the process associated with monitor 12.

On-site monitor 12 evaluates the sensor data and the malfunction data in current data storage 42 to place it in archive data storage 44 on a time-coherent basis in an operation 88. Similarly, on-site monitor 12 evaluates sensor data and malfunction data in current data storage 42 for storage in archive data storage 44 on a change detect basis in an operation 92. Data from operations 88 and 92 is stored in archive data storage 44 in an operation 90.

Action engine 26 (FIG. 1) analyzes the malfunction data (probability factors) and determines whether an anomalous condition exists in an activate action engine operation 94. Operations 82, 84, 86, 88, 92 and 94 occur in parallel within on-site monitor 12. If action engine 26 determines that an anomalous condition exists, remote notification module 28 produces a notification flag for transfer across link 23 via communications module 38 in an operation 96. Additionally, action engine 26 can modify time-coherent storage parameters via module 30 or modify change detect storage parameters via module 30 in operations 98 and 99, respectively.

The parallel data flow associated with operations 82, 84, 86, 88, 92, and 94 allow simultaneous review and storage of data as well as receipt of sensor data to occur without interruption based upon diagnostic and storage operations. In response to the notification flag across link 23, diagnostic center 14 pulls the malfunction data and sensor data via link 25 in an operation 102. Center 14 performs centralized diagnostics via operations and resource module 56 and operation 104.

Figure 3:
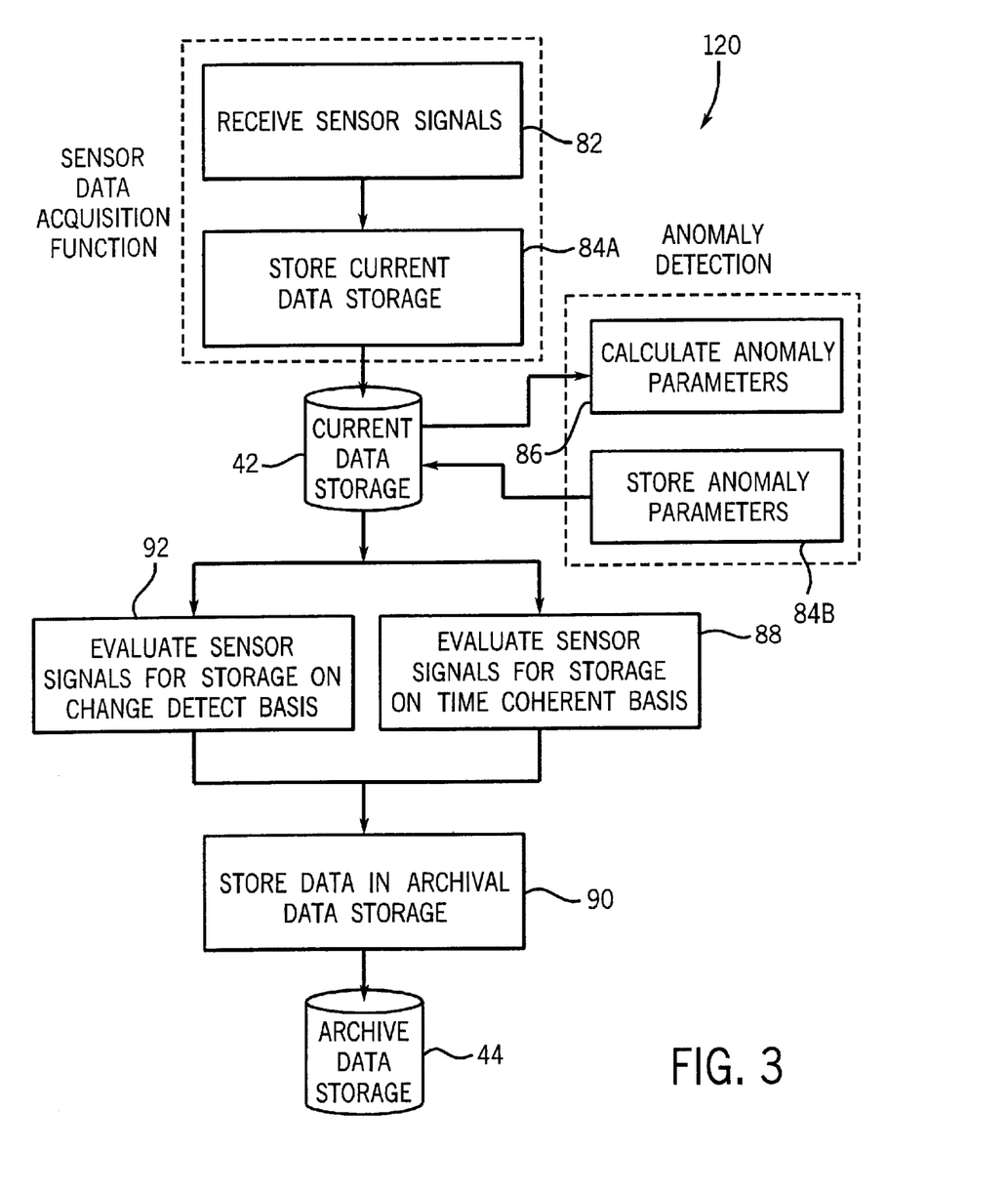
FIG. 3 is a more detailed block diagram showing data flows for data acquisition, anomaly detection, and archival modules associated with the on-site monitor of the diagnostic system illustrated in FIG. 1, in accordance with yet another exemplary embodiment of the present invention.

With reference to FIG. 3, a data flow diagram 120 represents data flow for data acquisition module 24, anomaly detection module 22, and data storage unit 34 (FIG. 1). Operation 84 discussed above with reference to FIG. 2 includes a store current sensor data operation 84A, and a store anomaly parameters operation 84B. In FIG. 3, operation 84A is performed in parallel with operation 84B. Operation 84A is performed by sensor data acquisition module 24, and operation 84B is performed by anomaly detection module 22.

Figure 4:
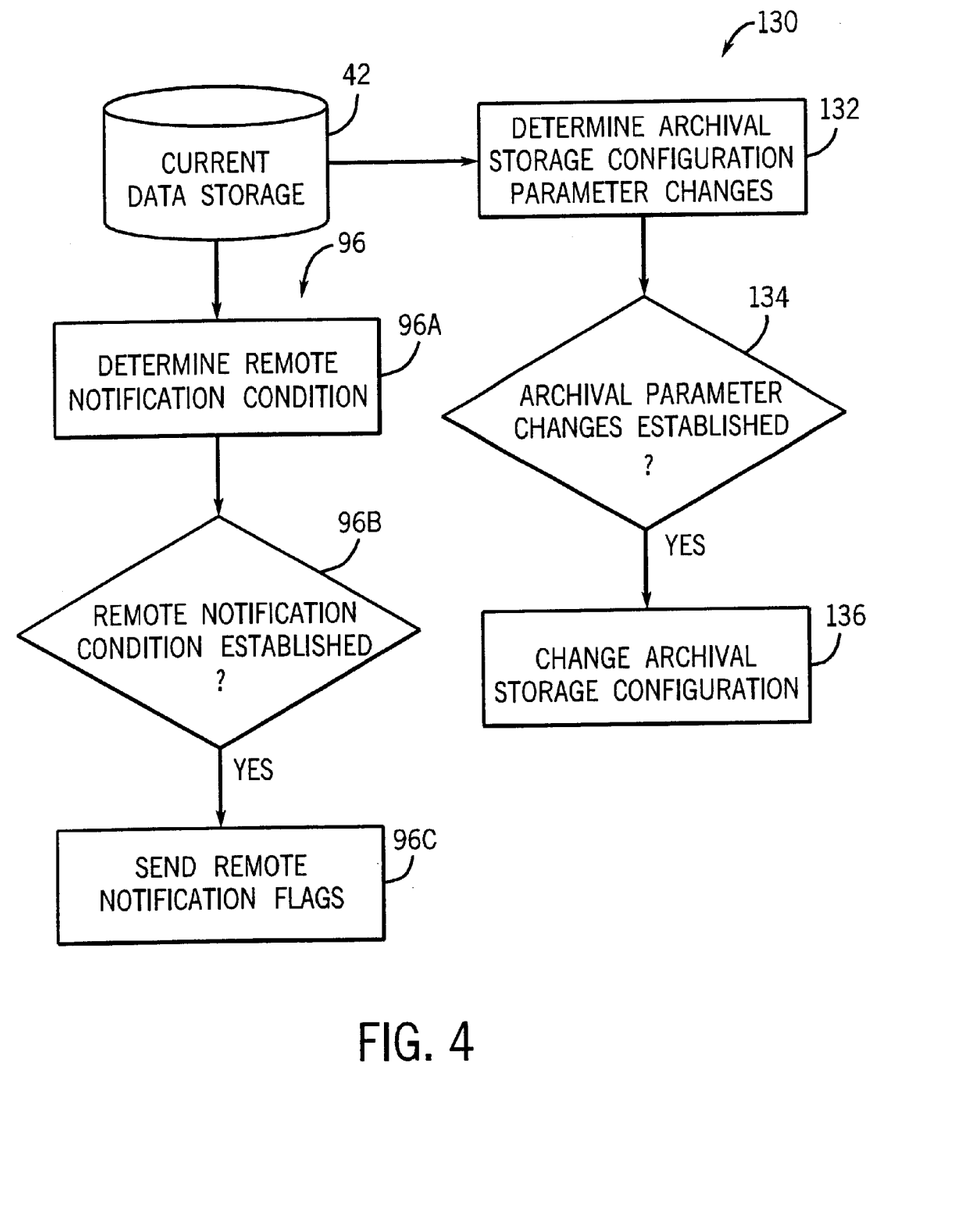
FIG. 4 is a more detailed block diagram showing data flows for an action engine associated with the on-site monitor of the diagnostic system illustrated in FIG. 1, in accordance with still yet another exemplary embodiment of the present invention.

With reference to FIG. 4, a data flow diagram 130 represents data flow for data associated with action engine 22 (FIG. 1). In FIG. 4, the remote notification flag operation 96 includes a determine notification condition operation 96A. In operation 96A, anomaly detection module 22 analyzes sensor data and anomaly data stored in current data storage 42 and determines if a remote notification condition has been established in an operation 96B. If so, module 28, under the control of action engine 22, sends a remote notification flag through module 38 to link 14 in an operation 96C. Additionally, action engine 26 controls the modification of storage parameter operations 98 and 99 (FIG. 2) in an operation 132. In operation 132, action engine 22 utilizes module 30 to determine storage configuration parameter changes for operations 88 and 92 (FIG. 2). In an operation 94, action engine 26 controls module 30 to establish changes in archival parameters and changes the archival parameters in an operation 136. The changes can be a change in time interval for time-coherent data sets, in a deadband for each parameter, and for a minimum and a maximum time between storage for change detect algorithms associated with operation 92.

Figure 5:
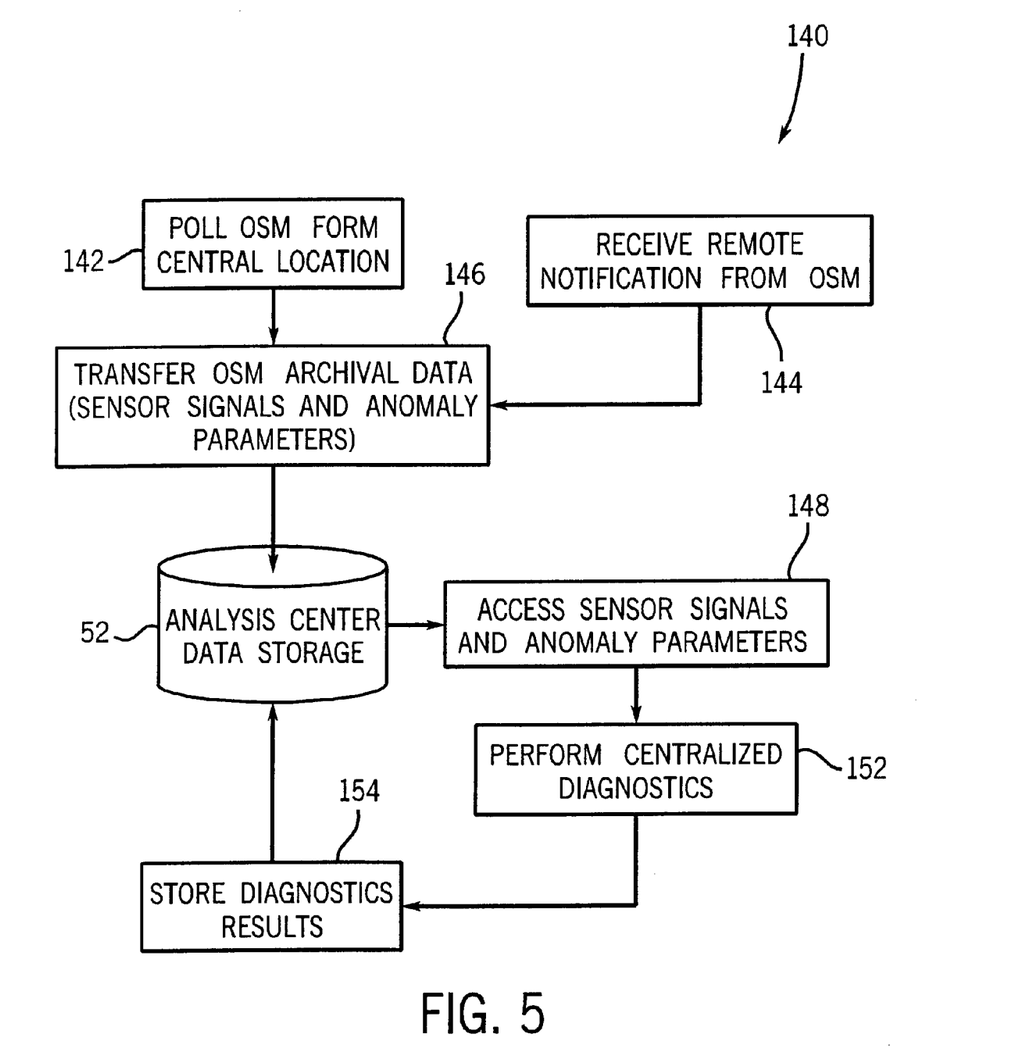
FIG. 5 is a more detailed block diagram showing data flows for the diagnostic center of the diagnostic system illustrated in FIG. 1 in accordance with even still another exemplary embodiment of the present invention.

With reference to FIG. 5, a data flow diagram 140 represents data flow for data associated with diagnostic center 14 (FIG. 1). Diagnostic center 14 can pull data from on-site monitor 12 on a periodic basis in an operation 142. Diagnostic center 14 can also receive a remote notification flag on link 23 from on-site monitor 12 in an operation 144. As a result of either operation 142 or 144, diagnostic center 14 can request the transfer of sensor data and anomaly (malfunction) data from archive data storage 44 in an operation 146. Monitor 12 sends the sensor data and malfunction data in archive data storage 44 (the sensor data and anomaly data pulled by diagnostic center 14). Center 14 can store the sensor data and anomaly data in archive unit 52 of diagnostic center 14.

Diagnostic center 14 accesses the sensor data and the malfunction data in an operation 148 via module 54 and performs centralized diagnostics in an operation 152 by module 56. Center 14 can also obtain previously stored results or data in archive 52 to generate diagnostic results. The results of diagnostics performed by module 56 are stored in archive 52 in an operation 154. The stored diagnostic results may also be sent in the form of reports or other formats for access by module 36 of monitor 12.

It is understood that while the detailed drawings, specific examples, and particular values given provide preferred exemplary embodiments of the present invention, the preferred exemplary embodiments are for the purpose of illustration only. The method and apparatus of the invention are not limited to the precise details and condition disclosed. For example, although particular sensor signals are described and listed, other types of sensor signals can be utilized. Various changes may be made in the details disclosed without departing from the spirit of the invention, which is defined by the following claims.

What is claimed is:

1. A diagnostic system for analyzing operation of a process, the process being monitored by a plurality of sensors, each sensor sensing a different parameter associated with the operation of the process, the sensors providing sensor signals to an interface for conditioning and digitizing the sensor signals and providing digital sensor data the diagnostic system comprising:

a local diagnostic unit located at a site associated with the process, the local diagnostic unit receiving the digital sensor data associated with the sensor from the sensors, the sensor data being received from the interface, the local diagnostic unit periodically and simultaneously storing the plurality of sensor data, the local diagnostic unit storing at least one sensor datum of the sensor data whenever the one sensor datum deviates from a previously stored value by a first predetermined amount.

2. The diagnostic system of claim 1, wherein the local diagnostic unit stores another sensor datum of the sensor data whenever the another sensor datum exceeds a previously stored value by a second predetermined amount.

3. The diagnostic system of claim 2, wherein the first predetermined amount is equal to the second predetermined amount.

4. The diagnostic system of claim 1, wherein the first predetermined amount is a predetermined percentage of the previous value or a predetermined fixed value.

5. The diagnostic system of claim 1, further comprising:
a central diagnostic unit located remote from the site, the central diagnostic unit communicating with the local diagnostic unit to obtain the sensor data stored by the local diagnostic unit.

6. The diagnostic system of claim 5, wherein the local diagnostic unit performs a local diagnostic analysis and sets flags indicating a malfunction, the flags being received by the central diagnostic unit when the stored sensor data are received.

7. A diagnostic system for analyzing operation of a process, the diagnostic system comprising;
a local database;
a local diagnostic unit located at a site associated with the process, the local diagnostic unit receiving a plurality of parameters associated with the process, the local diagnostic unit periodically stores the parameters in the local database, wherein the local diagnostic unit performs a local diagnostic analysis in response to the parameters and stores anomaly data in the database, the anomaly date indicating a probability of an anomaly, wherein the parameters are stored on a coherent basis and a change detect basis.

8. The diagnostic system of claim 7, wherein the local diagnostic analysis is in response to the anomaly data and the parameters.

9. The diagnostic system of claim 7, wherein the local diagnostic unit communicates a notification flag to a central diagnostic unit, wherein the diagnostic system includes the central diagnostic unit located remote from the site, the central diagnostic unit communicating with the local diagnostic unit to obtain the parameters stored by the local diagnostic unit.

10. The diagnostic system of claim 9, wherein the central diagnostic unit downloads the anomaly data and the parameters stored in the local database in response to the notification flag.

11. The diagnostic system of claim 10, wherein the notification flag is transmitted by a beeper communication link.

12. The diagnostic system of claim 7, wherein the local diagnostic unit stores the parameters in accordance with data storage parameters and the local diagnostic unit adjusts data storage parameters in response to the local diagnostic analysis.

13. The diagnostic system of claim 7, wherein the local diagnostic unit communicates a notification flag to a central diagnostic unit, wherein the diagnostic system includes the central diagnostic unit located remote from the site, the central diagnostic unit communicating with the local diagnostic unit to obtain the parameters stored by the local diagnostic unit, wherein the central diagnostic unit downloads the anomaly data and the parameters stored in the local database in response to the notification flag.

14. A method of diagnosing anomalies in an industrial process, the method comprising:
storing a plurality of different parameters on a time-coherent basis in a database in an on-site monitor;
storing at least one of the parameters on a change-detect basis in the database in the on-site monitor;
generating, with the on-site monitor, anomaly data in response to the parameters and storing the anomaly data in the database; and
communicating the anomaly data and the stored parameters to a remote diagnostic center.

15. The method of claim 14 further comprising:
providing results of diagnostics performed by the remote diagnostic center for viewing at a site associated with the on-site monitor.

16. The method of claim 15, wherein the on-site monitor is a web site and the results are provided to the on-site monitor.

17. The method of claim 15, further comprising:
viewing the results with web-based tools.

18. The method of claim 14, wherein the parameters include two parameters from the following group: speed, load, vibration, temperature, and fuel rate.

19. The method of claim 14 further comprising: generating a beeper or E-mail message in response to the anomaly data.

20. The method of claim 14 further comprising:
processing sensor signals in the on-site monitor to generate the parameters.

* * * * *